United States Patent [19]

Werner

[11] Patent Number: 4,465,312
[45] Date of Patent: Aug. 14, 1984

[54] TUNED BUMPER MOUNTING SYSTEM

[75] Inventor: Lawrence E. Werner, Grosse Pointe, Mich.

[73] Assignee: Chrysler Corporation, Highland Park, Mich.

[21] Appl. No.: 432,590

[22] Filed: Oct. 4, 1982

[51] Int. Cl.³ .............................................. B60R 19/00
[52] U.S. Cl. .................................... 293/132; 293/133; 293/136
[58] Field of Search ............... 293/120, 131, 132, 133, 293/135, 136, 154, 155; 403/225–228, 365

[56] References Cited

U.S. PATENT DOCUMENTS

| | | | |
|---|---|---|---|
| 2,706,126 | 4/1955 | Thiry | 403/255 |
| 4,005,891 | 2/1977 | Michals | 293/131 |
| 4,139,246 | 2/1979 | Mikashiba | 280/673 |
| 4,410,208 | 10/1983 | Mulso, Jr. et al. | 293/132 |

Primary Examiner—Robert R. Song
Attorney, Agent, or Firm—Edward P. Barthel

[57] ABSTRACT

A bumper mounting system for a motor vehicle includes a pair of bumper connectors which extend from the vehicle frame to support a bumper bar on their outer ends. Each connector extends substantially parallel with the vehicle longitudinal axis and is resiliently attached intermediate its fore and aft ends to the frame by an elastomeric isolator bracket assembly. The aft end of the connectors are flexibly coupled to the frame by means of a resilient pivotal support. The connectors allow the bumper to serve as a tuned dynamic absorber mass reducing bending amplitude of the vehicle body thereby avoiding undesirable resonant shake of the body structural components such as the floor pan, seats, steering column, wheels etc., during engine idle.

4 Claims, 4 Drawing Figures

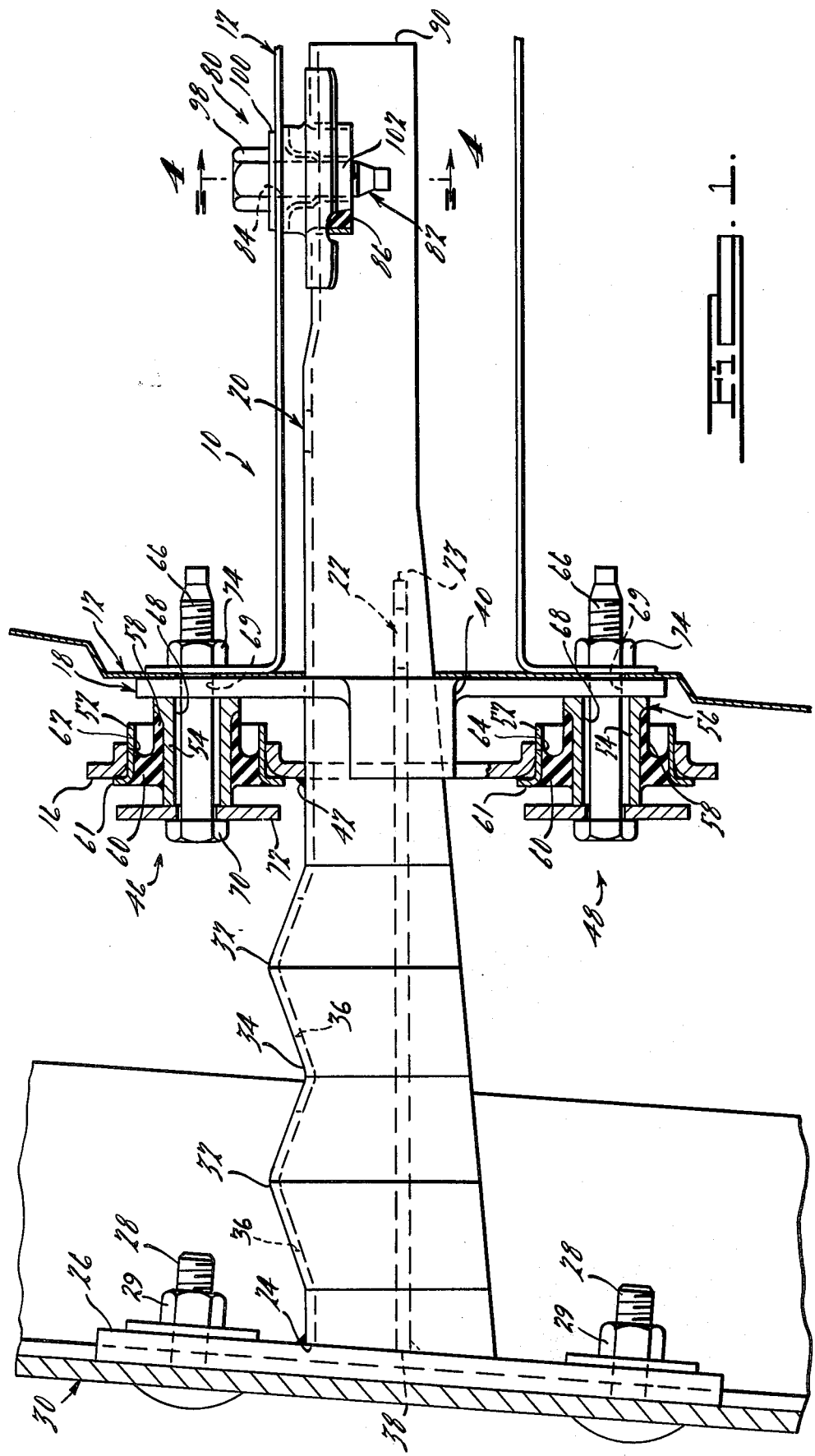

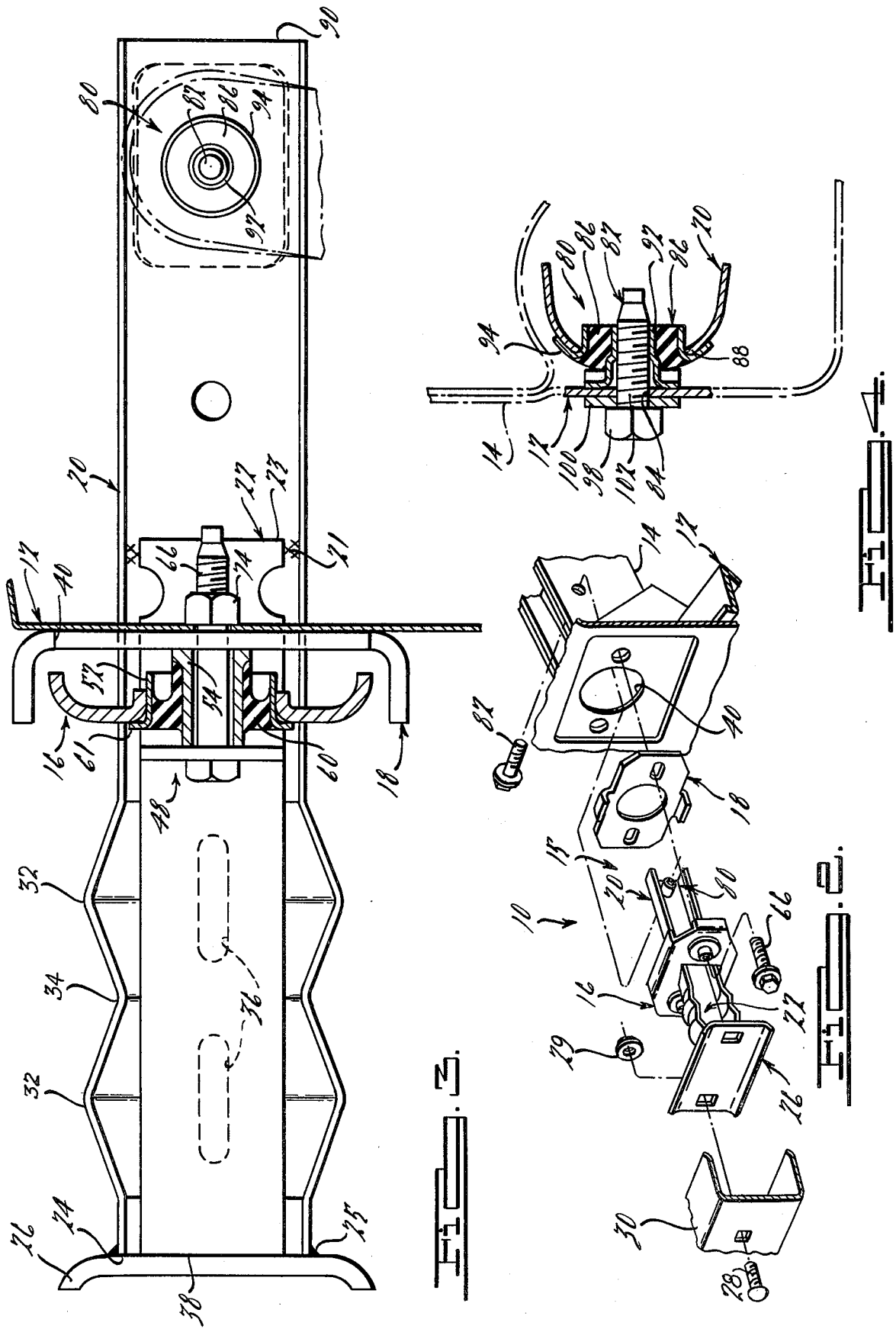

TUNED BUMPER MOUNTING SYSTEM

FIELD OF THE INVENTION

This invention relates to motor vehicles and more particularly to an improved system for mounting a bumper on a vehicle frame.

BACKGROUND OF THE INVENTION

The fundamental structural frequencies of a typical automobile body are generally a function of its overall dimension, i.e., length width and height. As car sizes are reduced the structural frequencies correspondingly increase. The typical engine for the "downsized" cars is a four cylinder engine. These engines cause the vehicle body structure to be excited by the engine firing pulses through the engine mounts. When the engine pulses substantially coincide with the fundamental body structural resonance, objectional vibrations or resonant shake of the body may be felt by the operator in the steering wheel, floor pans, seat or other body components over the normal idle speed range of the engine.

The most common solution to such resonant shake problems involve isolating the engine from the body and frame by low rate engine mounts. Such engine mounts, however, at some point become impractical due to excessive engine deflections.

SUMMARY OF THE INVENTION

The invention provides a bumper support system including a pair of bumper connectors extending from a vehicle frame supporting a horizontally disposed bumper bar. Each connector aft end remote from the bumper bar, is attached by pivotal means to the vehicle frame. The connector is elastically mounted to the frame by a bracket assembly comprising a pair of longitudinally spaced vertically disposed plate members denoted as the center plate and the limiter plate. The center plate is fixedly secured to its connector intermediate the ends of the connector. The limiter plate is adapted to be fixedly attached to the vehicle frame. A pair of isolator resilient mounts are arranged in symmetrical fashion from the connector axis to elastically interconnect the plates. The bumper bar is mounted on the front end of the pair of connectors for operation as a tuned dynamic absorber mass. This results from the connectors resiliently pivoting in substantially parallel longitudinally extending vertical planes over a determined vibration range about their respective pivotal means. The resultant bumper system causes a reduction in amplitude of the vehicle body and, thus its resonant shake because of the tuned frequency of the bumper bar.

It is thus an object of the present invention to provide an improved, easily manufactured and assembled bumper mounting system which functions as a tuned vibration absorber by pivoting the bumper bar mass at a spring rate to reduce the amplitude of the vehicle body and dampen resonant shake between the engine and the body components such as the floor pan, seats, steering column and the like during engine idle.

BRIEF DESCRIPTION OF THE DRAWINGS

The above and other objects and features of the invention will now be described in detail with reference to the accompanying drawings in which:

FIG. 1 is a top elevational view, partly in section, of a bumper mounting system mounted on the front end of an automotive vehicle;

FIG. 2 is an exploded perspective view of a lefthand bumper mounting system;

FIG. 3 is a side elevational view, partly in section, of the bumper mounting system of FIG. 1; and FIG. 4 is a fragmentary vertical sectional view taken on line 4—4 of FIG. 1.

DETAILED DESCRIPTION OF THE INVENTION

Turning now to the drawings, there is disclosed in FIGS. 1 and 2 a lefthand bumper connector unit 10. The unit 10 together with a mirror image righthand unit (not shown) is connected to the vehicle chassis frame 12 at one of its side rails 14 by an isolator bracket assembly 15. Each bracket assembly 15 includes a center bracket plate 16 and a limiter bracket plate 18. The unit 10 includes a longitudinally extending connector which, in the disclosed embodiment, is in the form of an impact energy absorber of the controlled collapse type shown in copending U.S. patent application Ser. No. 317,653 now U.S. Pat. No. 4,410,208 to Mulso Jr. and Smith and assigned to the assignee of this application. The unit 10 is shown including an outer C-shaped connector member 20 having an inner plate or blade-like member 22 which extends substantially parallel to the longitudinal axis of the vehicle. The blade member 22 has its inner end 23 secured to the connector member 20 as by welds 21.

The outer connector member 20 has its one forward end 24, away from the vehicle, secured as by welds 25, to the inner surface of a lefthand bumper fixture 26. The lefthand fixture 26 together with a righthand fixture (not shown) support, by suitable means such as fasteners 28 and nuts 29, a bumper assembly indicated at 30 in FIG. 1. The outer connector member 20 is shown as a composite structure including a corrugated portion formed with a plurality of radiating corrugations having peaks 32 and an intermediate valley 34. As seen in FIG. 2 the corrugated valley 34 and peaks 32 have a substantially half-circle or C-shaped cross-section. Each of the corrugations is provided with a single longitudinally extending slot 36 with its axis on the horizontal plane of symmetry of the outer member 20. As explained in the copending U.S. patent application Ser. No. 371,653 now U.S. Pat. No. 4,410,208, the slotted corrugations allow the plastic deformation of the mounting units to be varied by modifying the size of the slots 36 so as to control the rate of deformation of the corrugated portion of member 20.

In the disclosed form the inner blade member 22 has its outer end 38 secured as by welding to the inner surface of the bumper fixture 26. Each inner blade member 22 serves as a guide to maintain its associated mounting unit 10 substantially in the common horizontal plane of the bumper during a bumper impact.

The connector member 20 extends through an oversize clearance hole in the form of a circular opening 40 in the limiter bracket plate 18. The center bracket plate 16 is welded at 42 to the outer connector member 20. Further, the center bracket plate 16 is secured by a pair of symmetrically spaced identical elastomeric spring isolator mounts 46 and 48, respectively, to the limiter bracket 18. In the disclosed form the mounts 46 and 48 are horizontally spaced in a side-by-side symmetrical manner on either side of the connector member 20.

As both isolator mounts 46 and 48 are identical only one of the mounts will be described in detail. Each isolator spring mount 46 and 48 comprises a cylindrical flanged outer sleeve 52 and an inner bushing 54 separated by an L-sectioned elastomeric member 56. The member 56 has a tubular portion 58 adhesively bonded, such as by vulcanization, to the inner bushing 54. Member 56 has an annular radial portion 60 which is bonded to the outer sleeve 52 adjacent annual lip flange 61 which extends radially outwardly from the outer sleeve 52.

As seen in FIG. 1, the outer sleeve 52 is sized for telescopic reception in center bracket side circular aperture 62 while the other side mount 48 is similarly received in the remaining side circular aperture 64. The side mount 46 is floatingly retained to the limiter bracket plate 18 by fastener means in the form of bolts 66 extending through bores 68 of respective inner bushings 54 and limiter bracket holes 69. Each bolt head 70 and washer 72 applies an axial load to its associated outer lip flange 61 upon tightening of the bolts 66 in nuts 74. It will be noted that the nuts 74 are welded to the frame. The fasteners 66 serve as the only means for attaching the resilient mounts against their associated center bracket plate.

At the inner vehicle end of each bumper bar outer connector 20 a pivotal attaching means is provided and indicated generally at 80. As best seen in FIG. 4 the pivotal attaching means comprises a transverse fastener or bolt 82 extending through an aperture 84 in the vehicle frame 12. A resilient mounting socket 86 is fixedly inserted in opening 88 adjacent the aft end 90 of connector member 20. The resilient mount socket 86 includes an inner sleeve 92 and an outer eyelet 94 concentrically spaced by the intermediate elastomeric doughnut-shaped socket 86 suitably bonded both to the sleeve 92 and eyelet 94. The bolt head 98 is spaced from the frame by washer 100 while its stem is threadably received by the sleeve 92.

In the instant embodiment of the invention the dynamic absorber bumper bar 30 acts as an oscillating pivotal mass movable in a vertical plane about the pivotal resilient coupling. In this form the bolt threaded stem 102 provides a transverse flexibly isolated pivotal axis wherein the inner end portion of the connector member 20 pivots relative to the frame by means of the resilient isolator pivotal member 80 and the pair of isolator spring mounts 46 and 48.

The tuning of the bar 30 to the desired precise frequency requires determining the natural frequency of the bumper system which, in turn, is directly proportional to the rotational stiffness of the bumper system. This is a function of the product of the vertical dynamic spring rate of the elastic isolator mounts 46 and 48 and their longitudinal distance to the pivotal axis of the bolt 82; together with the fore and aft spring rate of the isolator mounts 46 and 48 and their distance to the longitudinal axis of the blade-like member 22.

The natural frequency of the bumper system is also inversely proportional to the mass moment of inertia of the bar 30 about the pivotal axis of the bolt 82. This, in turn, is primarily a function of the bumper bar's weight and its distance squared to the pivotal axis of the bolt 82. It will be noted that the individual component inertias must also be taken into consideration.

The effectiveness of the tuned bumper system is dependent upon the inertia of the system relative to the effective mass of the vehicle structure. Higher inertia bumper systems will offer improved vibration absorbtion. The effectiveness of the system is also a function of the damping properties of the elastic material 60 used in the isolator mounts 46 and 48. It will be appreciated that a compromise must be made to present a broad frequency based on range while retaining the desired reduction in amplitude of the bumper bar 30.

Although only one embodiment of the invention has been disclosed and described, it is apparent that other embodiments and modifications of the invention are possible.

What is claimed is:

1. In an automotive vehicle body having a frame with a horizontal bumper bar disposed substantially transverse to the longitudinal axis of the vehicle frame, the combination therewith of a tuned bumper bar vibration absorber support system comprising:

a plurality of bumper bar support connectors extending substantially parallel to said frame axis, each said connector aft end remote from said bumper bar terminating in pivotal attaching means such that each said connector aft end is pivotally mounted to said frame for pivotal movement about a fixed horizontally disposed axis;

each said connector having an elastomeric isolator bracket assembly intermediate its fore and aft ends resiliently supporting its associated connector on said vehicle frame;

said bracket assembly having a pair of elastomeric spring and dampening isolator mounts horizontally spaced in a side-by-side symmetrical predetermined manner on either side of said connector; and means fixedly supporting the bumper bar on the fore ends of the connectors whereby the bumper bar serves as a tuned dynamic absorber mass by virtue of each said support connector operative for movement in a longitudinally extending vertical plane about said horizontal axis and having a spring rate at its associated bracket assembly over a determined vibratory range thereby attaining reduced shake of the vehicle body.

2. In an automotive vehicle body having a frame with a horizontal bumper bar disposed substantially transverse to the longitudinal axis of the vehicle frame, the combination therewith of a tuned bumper bar vibration absorber support system comprising:

a plurality of bumper bar support connectors extending substantially parellel to said frame axis, each said connector aft end remote from said bumper bar terminating in pivotal attaching means such that each said connector aft end is pivotally mounted to said frame;

each said connector having an elastomeric isolator bracket assembly intermediate its fore and aft ends resiliently supporting its associated connector on said vehicle frame;

each said bracket assembly having a pair of longitudinally spaced, vertically oriented plates, said plates including a forwardly disposed center plate and a rearwardly disposed limiter plate, said center plate fixedly secured to said connector, said limiter plate having a central opening whereby its associated connector is received therethrough in a spaced circumscribing manner;

each said bracket assembly having a plurality of elastomeric spring mounting means associated therewith operative for retaining said center plate in a resiliently isolated manner in spaced relation with said limiter plate, said mounting means further operative for fixedly attaching its associated limiter plate on the vehicle frame; and means for fixedly supporting the bumper bar on the fore ends of the connectors whereby the bumper bar serves as a tuned dynamic absorber mass by virtue of each said support connector operative for movement in a longitudinally extending vertical plane about said pivotal attaching means and having a spring rate at its associated bracket assembly over a determined vibratory range thereby attaining reduced shake of the vehicle body.

3. The tuned bumper bar support system according to claim 2, wherein each said limiter plate having a pair of relatively small holes aligned on opposite sides of its central opening;

each said center plate having a pair of relatively large holes axially aligned with an associated one of the limiter plate holes;

each said elastomeric isolator spring mounting means comprising an inner tubular sleeve and an outer flanged sleeve of rigid load sustaining material spaced radially outwardly of an intermediate elastomeric bushing permanently bonded to its associated inner and outer sleeves;

the inner sleeve of a determined axial dimension greater than its associated outer sleeve defining transversely disposed oppositely facing shoulders; said outer sleeve sized for reception in one of the center plates holes; and a fastener extending through, in succession, an associated inner sleeve, an aligned limiter plate hole and an aligned hole in the frame, the fastener operative for maintaining a compressive axial force on said inner sleeve shoulders and the frame such that said fastener retains the center plate, connector and bumper bar in resilient isolated assembly with its asociated limiter plate.

4. The tuned bumper bar support system according to claim 2, wherein said pivotal attaching means comprisess a bolt aligned on a transverse, horizontally disposed axis, said bolt extending through a resilient mounting socket located in an aperture in the vehicle frame, said resilient mounting socket including an inner sleeve and an outer eyelet concentrically spaced by an intermediate elastomeric socket suitably bonded both to said sleeve and said eyelet.

* * * * *